(12) United States Patent
Klett

(10) Patent No.: US 6,287,375 B1
(45) Date of Patent: Sep. 11, 2001

(54) PITCH BASED FOAM WITH PARTICULATE

(75) Inventor: James W. Klett, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/400,667

(22) Filed: Sep. 21, 1999

(51) Int. Cl.[7] .................................................. H01B 1/04
(52) U.S. Cl. .......................... 106/122; 252/502; 264/53; 264/54
(58) Field of Search .............................. 252/502; 264/53, 264/54; 106/122

(56) References Cited

U.S. PATENT DOCUMENTS

| 3,859,421 | 1/1975 | Hucke . |
|---|---|---|
| 4,276,246 | 6/1981 | Bonzom et al. . |
| 4,847,021 | 7/1989 | Montgomery et al. . |
| 5,631,086 | * 5/1997 | Singer et al. ........................ 252/502 |
| 6,037,032 | * 3/2000 | Klett et al. ............................ 428/71 |

FOREIGN PATENT DOCUMENTS

WO 99 11585   3/1999   (WO) .

* cited by examiner

*Primary Examiner*—Morton Foelak
(74) *Attorney, Agent, or Firm*—Akerman, Senterfitt & Eidson, P.A.

(57) ABSTRACT

A thermally conductive, pitch based foam composite having a particulate content. The particulate alters the mechanical characteristics of the foam without severely degrading the foam thermal conductivity. The composite is formed by mixing the particulate with pitch prior to foaming.

10 Claims, 2 Drawing Sheets

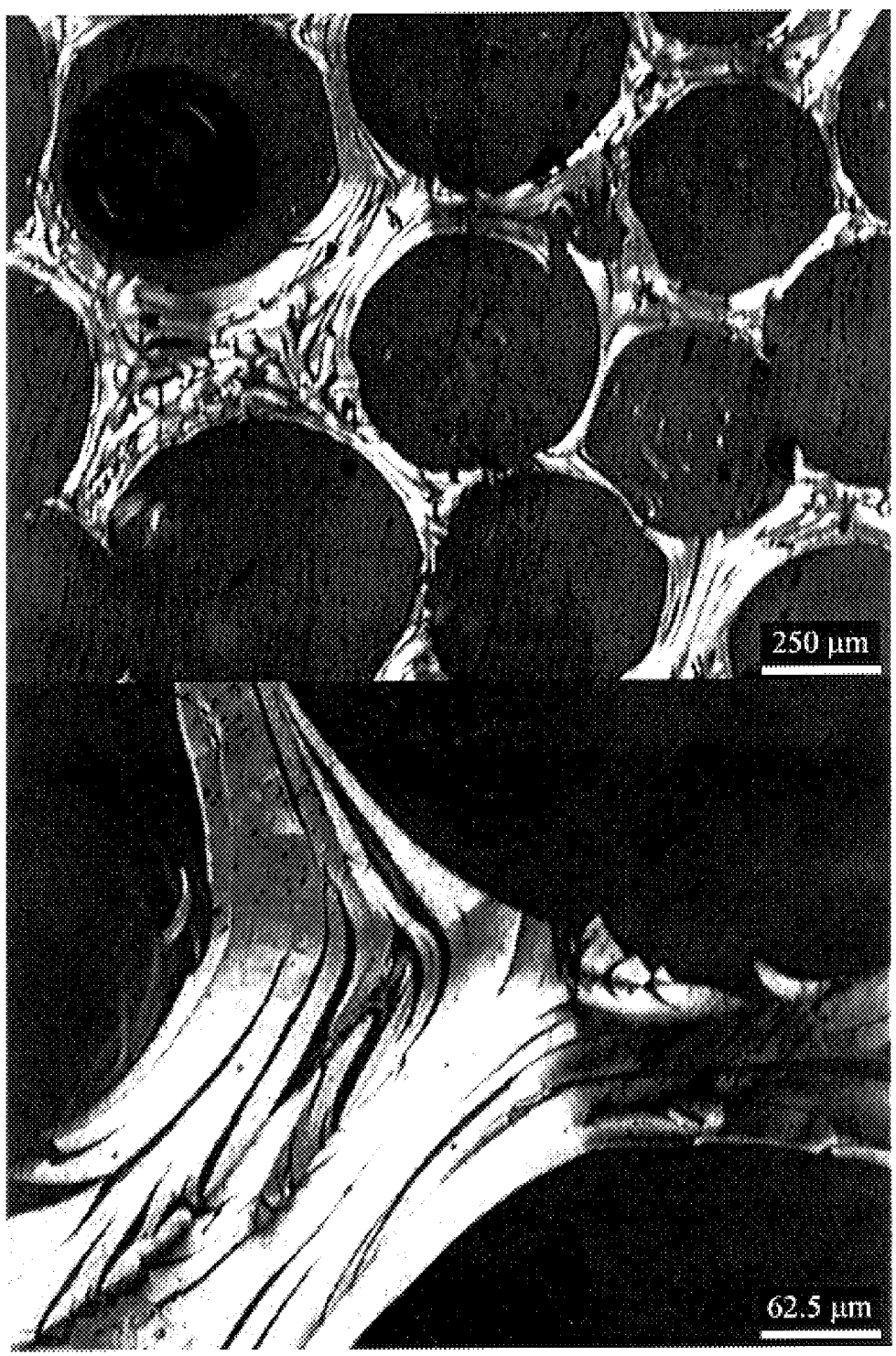
Figure 1. Foam produced without particulates (neat).

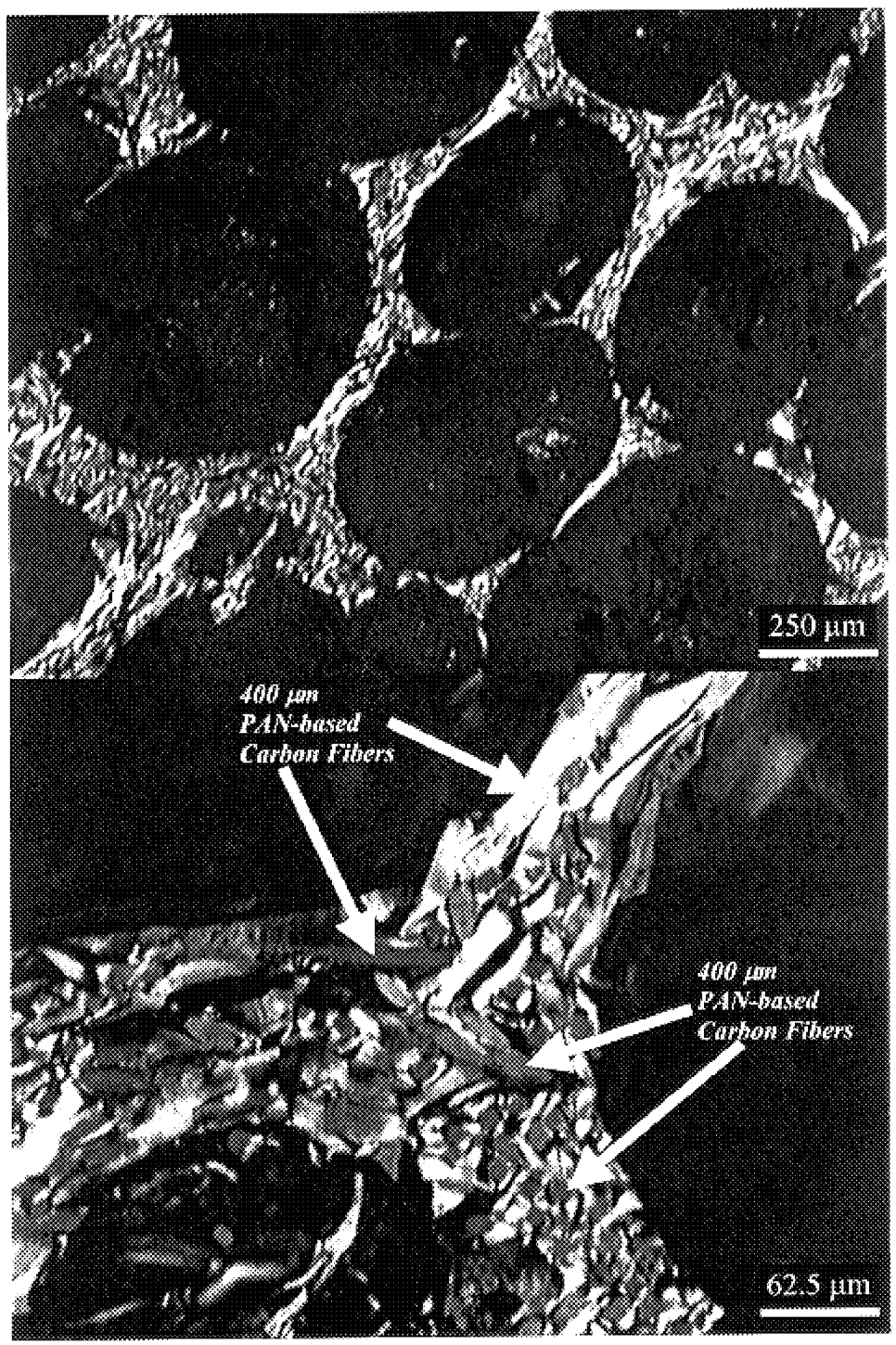
Figure 2. Foam produced with 400 mm PAN-based carbon fibers.

PITCH BASED FOAM WITH PARTICULATE

STATEMENT REGARDING FEDERALLY SPONSORED RESEARCH OR DEVELOPMENT

The United States Government has rights in this invention pursuant to contract No. DE-AC05-96OR22464 between the United States Department of Energy and Lockheed Martin Energy Research Corporation.

CROSS-REFERENCE TO RELATED APPLICATIONS

Not Applicable.

BACKGROUND OF THE INVENTION

The present invention relates to pitch based foam, and more particularly to a pitch based foam which includes a particulate which alters the foam mechanical characteristics.

The extraordinary mechanical properties of commercial carbon fibers are due to the unique graphitic morphology of the extruded filaments. See Edie, D.D., "Pitch and Mesophase Fibers," in *Carbon Fibers, Filaments and Composites*, Figueiredo (editor), Kluwer Academic Publishers, Boston, pp. 43–72 (1990). Contemporary advanced structural composites exploit these properties by creating a disconnected network of graphitic filaments held together by an appropriate matrix. Carbon foam derived from a pitch precursor can be considered to be an interconnected network of ligaments or struts. As such interconnected networks, they would represent a potential alternative as a reinforcement in structural composite materials.

Recent developments of fiber-reinforced composites has been driven by requirements for improved strength, stiffness, creep resistance, and toughness in structural engineering materials. Carbon fibers have led to significant advancements in these properties in composites of various polymeric, metal, and ceramic matrices.

However, current applications of carbon fibers has evolved from structural reinforcement to thermal management in application ranging from high density electronic modules to communication satellites. This has stimulated research into novel reinforcements and composite processing methods.

High thermal conductivity, low weight, and low coefficient of thermal expansion are the primary concerns in thermal management applications. See Shih, Wei, "Development of Carbon-Carbon Composites for Electronic Thermal Management Applications," IDA Workshop, May 3–5, 1994, supported by AF Wright Laboratory under Contract Number F33615-93-C-2363 and AR Phillips Laboratory Contract Number F29601-93-C-0165 and Engle, G. B., "High Thermal Conductivity C/C Composites for Thermal Management," IDA Workshop, May 3–5, 1994, supported by AF Wright Laboratory under Contract F33615-93-C-2363 and AR Phillips Laboratory Contract Number F29601-93-C-0165. Such applications are striving towards a sandwich type approach in which a low density structural core material (i.e. honeycomb or foam) is sandwiched between a high thermal conductivity facesheet.

Structural cores are limited to low density materials to ensure that the weight limits are not exceeded. Unfortunately, carbon foams and carbon honeycomb materials are the only available materials for use in high temperature applications (>1600° C.). High thermal conductivity carbon honeycomb materials are extremely expensive to manufacture compared to low conductivity honeycombs, therefore, a performance penalty is paid for low cost materials Typical foaming processes utilize a "blowing" technique to produce a foam of the pitch precursor. The pitch is melted and pressurized, and then the pressure is reduced. Thermodynamically, this produces a "Flash," thereby causing the low molecular weight compounds in the pitch to vaporize (the pitch boils), resulting in a pitch foam. See Hagar, Joseph W. and Max L. Lake, "Novel Hybrid Composites Based on Carbon Foams," *Mat. Res. Soc. Symp.*, Materials Research Society, 270:29–34 (1992), Hagar, Joseph W. and Max L. Lake, "Formulation of a Mathematical Process Model Process Model for the Foaming of a Mesophase Carbon Precursor," Mat. Res. Soc. Symp., Materials Research Society, 270:35–40 (1992), Gibson, L. J. and M. F. Ashby, *Cellular Solids: Structures & Properties*, Pergamon Press, New York (1988), Gibson, L. J., Mat. Sci. and Eng A110 (1989), Knippenberg and B. Lersmacher, Phillips Tech. Rev., 36(4), (1976), and Bonzom, A., P. Crepaux and E. J. Moutard, U.S. Pat. No. 4,276,246, (1981). Additives can be added to promote, or catalyze, the foaming, such as dissolved gases (like carbon dioxide, or nitrogen), talc powder, freons, or other standard blowing agents used in making polymer foams.

Then, unlike polymer foams, the pitch foam must be oxidatively stabilized by heating in air (or oxygen) for many hours, thereby, cross-linking the structure and "setting" the pitch so it does not melt, and deform the structure, during carbonization. See Hagar, Joseph W. and Max L. Lake, "Formulation of a Mathematical Process Model Process Model for the Foaming of a Mesophase Carbon Precursor, *Mat. Res. Soc. Symp.*, Materials Research Society, 270:35–40 (1992) and White, J. L., and P. M.

Shaeffer, Carbon, 27:697 (1989). This is a time consuming step and can be an expensive step depending on the part size and equipment required.

Next, the "set" or oxidized pitch foam is then carbonized in an inert atmosphere to temperatures as high as 1100° C. Then, a final heat treatment can be performed at temperatures as high as 3000° C. to fully convert the structure to carbon and produce a carbon foam suitable for structural reinforcement. However, these foams as just described exhibit low thermal conductivities.

Other techniques may utilize a polymeric precursor, such as phenolic, urethane, or blends of these with pitch.

See Hagar, Joseph W. and Max L. Lake, "Idealized Strut Geometries for Open-Celled Foams," *Mat. Res. Soc. Symp.*, Materials Research Society, 270:41–46 (1992), Aubert, J. W., (MRS Symposium Proceedings, 207:117–127 (1990), Cowlard, F. C. and J. C. Lewis, *J. of Mat. Sci.*, 2:507–512 (1967) and Noda, T., Inagaki and S. Yamada, *J. of Non-Crystalline Solids*, 1:285–302, (1969). However, these precursors produce a "glassy" or vitreous carbon which does not exhibit graphitic structure and, thus, has a very low thermal conductivity and low stiffness as well. See Hagar, Joseph W. and Max L. Lake, "Idealized Strut Geometries for Open-Celled Foams," *Mat. Res. Soc. Symp.*, Materials Research Society, 270:41–46 (1992).

One technique developed by the inventor of the present invention, and is fully disclosed in commonly assigned U.S. patent application Ser. No. 08/921,875. It overcomes these limitations, by not requiring a "blowing" or "pressure release" technique to produce the foam. Furthermore, an oxidation stabilization step is not required, as in other methods used to produce pitch-based carbon. This process is less time consuming, and therefore, will be lower in cost and easier to fabricate than the prior art above. More importantly, this process is unique in that it produces carbon foams, such as shown in FIG. 1, with high thermal conductivities, greater than 58 W/m•K and up to 187 W/m•K.

Altering the mechanical characteristics, such as the density, compressive strength, and the like, of the carbon foam produced using the inventor's method, however, requires altering the process parameters, such as the temperatures and pressures at various stages of the process. This can affect the thermal conductivity of the final foam product. Therefore, it is desirable to produce a highly thermally conductive foam in which the mechanical characteristics are altered while maintaining the high thermal conductivity of the foam.

SUMMARY OF THE INVENTIOIN

The invention provides a thermally conductive, pitch based foam having a particulate content. The particulate alters the mechanical characteristics of the foam without severely degrading the foam thermal conductivity.

The general objective of the present invention is to provide a pitch derived foam having a high thermal conductivity and altered mechanical characteristics. This objective is accomplishing by mixing particulate with pitch materials prior to forming the foam. The particulate alter the mechanical characteristics of the foam without severely degrading the foam thermal conductivity.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 1 is a micrograph illustrating pitch based foam without a particulate; and

FIG. 2 is a micrograph illustrating pitch based foam incorporating the present invention.

DETAILED DESCRIPTION OF THE INVENTION

Particulate in a high thermal conductivity pitch based foam can significantly alter the mechanical characteristics of the resulting foam composite while maintaining a high thermal conductivity. As shown in FIG. 2, the particulate (some of which are designated by arrows) is integrated into a pitch based thermally conductive foam, such as fully disclosed in U.S. patent application Ser. Nos. 08/921,875, and 08/923,877 which are commonly owned by the assignee of the present application, and which teachings are fully incorporated herein by reference, to form the foam composite.

The foam composite can be formed by placing pitch materials, such as in the form of powder, granules, or pellets, and particulate in a container forming a dry mixture. The mixture can be solvated if desired. The particulate can be any material which does not decompose at the processing temperatures required to form the carbon foam composite. Preferably, the particulate is carbon fibers, such as polyacrylnitrile (PAN) based carbon fibers, pitch based carbon fibers, vapor grown carbon nano fibers, carbon nano-tubes, and the like.

The mixture is heated in a substantially oxygen-free environment to avoid oxidation of the pitch materials during heating. Preferably, the mixture is heated in a furnace which has been evacuated to less than 1 torr. Alternatively, the mixture is heated under a blanket of inert gas, such as nitrogen, to avoid oxidation of the pitch. The mixture is heated to a temperature approximately 50 to 100° C. above the softening point of the pitch materials causing it to melt. For example, where Mitsubishi ARA24 mesophase pitch is used, a temperature of 300° C. is sufficient. Alternatively, the pitch is melted as described above, and the particulate is mixed into the melted pitch.

If the mixture is heated in a vacuum, once the pitch materials are melted, the vacuum is released to a nitrogen blanket. The pressure inside the furnace is then increased up to about 1000 psi, and the temperature of the system is then raised to cause the evolution of pyrolysis gases to form a viscous pitch foam composite. Although raising the pressure to about 1000 psi is preferred, the pressure may be lower to provide a less dense foam composite, or higher to provide a higher composite, if desired. The preferred temperature for foaming will depend upon the precursor pitch used. The preferred foaming temperature range for ARA24 mesophase pitch is between 420C. and 520C. Most preferably, the foaming temperature range is between 420C. and 450C.

The temperature inside the furnace is then raised to a temperature sufficient to coke (harden) the viscous pitch foam composite which when the ARA24 mesophase pitch is used is about 500° C. to 1000° C. This is performed, preferably, at about 2° C./min. This heating rate is dependent upon the size and shape of the pitch derived foam in the container or mold. Preferably, the temperature inside the furnace is held for at least 15 minutes to achieve an assured soak.

Once the viscous pitch foam composite is coked, it is cooled to room temperature. Preferably the foam is cooled at a rate of approximately 1.5° C./min. During the cooling cycle, pressure is released gradually to atmospheric conditions. Preferably, the pressure inside the furnace is released at a rate of approximately 2 psi/min. The molded pitch based foam is then separated from the container.

Prior to cooling, the foam composite can be further processed to provide additional properties, such as by densifying the foam. For example, the molded foam can be heat treated to 1050° C. (carbonized) under a nitrogen blanket, and then heat treated in separate runs to 2500° C. and 2800° C. (graphitized) in Argon.

In the examples below, using the method disclosed above, a particulate comprising carbon fibers is mixed dry in a beaker, heated in a furnace, and then foamed at the pressure indicated. The resulting pitch derived foam composite is heated to a temperature of 1000C at a rate of 0.2C/min to carbonize the composite, and then further heated from 1000C to 2800C at a rate of 1C/min and soaked at 2800C for two hours to graphitize the foam composite.

EXAMPLE 1

A pitch based foam composite was formed by mixing 66 grams of Fortafil 3(C) milled 400 micron fibers, a polyacrylnitrile based carbon fiber, and 200 grams of ARA24 mesophase pitch to produce a foam composite having a mass fraction of fibers of approximately 33%. The composite was foamed at a pressure of 1000 psi.

EXAMPLE 2

A carbon foam composite was formed by mixing 37.7 grams of Fortafil 3(C) milled 400 micron fibers and 749.8 grams of ARA24 mesophase pitch to produce a foam composite having a mass fraction of fibers of approximately 5%. The composite was foamed at a pressure of 1000 psi.

EXAMPLE 3

A pitch based foam composite was formed by mixing 38 grams of Fortafil 3(C) milled 400 micron fibers and 750 grams of ARA24 mesophase pitch to produce a foam composite having a mass fraction of fibers of approximately 5%. The composite was foamed at a pressure of 1000 psi.

EXAMPLE 4

A pitch based foam composite was formed by mixing 30 grams of Amoco DKD-X 400 micron fibers and 270 grams of ARA24 mesophase pitch to produce a foam composite having a mass fraction of fibers of approximately 10%. The composite was foamed at a pressure of 400 psi.

EXAMPLE 5

A pitch based foam composite was formed by mixing 30 grams of Amoco DKD-X 400 micron fibers and 270 grams of ARA24 mesophase pitch to produce a foam composite having a mass fraction of fibers of approximately 10%. The composite was foamed at a pressure of 600 psi.

EXAMPLE 6

A pitch based foam composite was formed by mixing 30 grams of Amoco DKD-X 400 micron fibers and 270 grams of ARA24 mesophase pitch to produce a foam composite having a mass fraction of fibers of approximately 10%. The composite was foamed at a pressure of 800 psi.

EXAMPLE 7

A pitch based foam composite was formed by mixing 30 grams of Amoco DKD-X 400 micron fibers and 270 grams of ARA24 mesophase pitch to produce a foam composite having a mass fraction of fibers of approximately 10%. The composite was foamed at a pressure of 1000 psi.

EXAMPLE 8

A pitch based foam composite was formed by mixing 6 grams of Applied Sciences Pyrograph III Vapor Grown Fibers, a vapor grown carbon nano fiber, and 400 grams of ARA24 mesophase pitch to produce a foam composite having a mass fraction of fibers of approximately 1.5% . The composite was foamed at a pressure of 1000 psi.

The following Table 1 compares the densities, compressive strengths, and thermal conductivities of Examples 4–8 to graphitized pitch based foam. The characteristics of graphitized pitch based foam without a particulate content is designated in the table by a "*". The sample indicated with a "**" was and all other samples were graphitized at 10° C./min.

TABLE 1

| Example | Foaming Pressure (psi) | Density (g/cm3) | Fiber Content (%) | Compressive Strength (MPa) | Thermal Conductivity W/mK |
|---|---|---|---|---|---|
| 4 | 400 | 0.25 | 10.0 | 0.61 | 58‡ |
| 5 | 600 | 0.32 | 10.0 | 0.93 | 43‡ |
| 6 | 800 | 0.44 | 10.0 | 1.65 | 80‡ |
| 7 | 1000 | 0.51 | 10.0 | 2.68 | 69‡ |
| 8 | 1000 | 0.39 | 1.5 | 0.75 | 68‡ |
| * | 400 | 0.25 | 0 | — | 51‡ |
| * | 600 | 0.39 | 0 | — | 75‡ |
| * | 800 | 0.48 | 0 | — | 105‡ |
| * | 1000 | 0.57 | 0 | 2.1 | 149‡ |
| * | 1000 | 0.57 | 0 | — | 187† |

†graphitized at 1° C./min
‡graphitized at 10° C./min

It will thus be seen that a highly conductive pitch based foam which includes particulate can be formed using the method disclosed above. As shown in Table 1, the foam exhibits an altered mechanical characteristics while exhibiting high thermal conductivities comparable to a pitch based foam without the particulate produced with this same general method.

Examples 4–7 demonstrate that density and compressive strength is affected by foaming pressure even when the fiber content is 10% of the foam mass. Comparing Examples 7 and 8 to the carbon foam without a fiber content shows that the thermal conductivity of the foam having a fiber content falls within the range of thermal conductivities exhibited by the non-fiber content fiber foam. Further examination of Example 8 reveals that a fiber content as low as 1.5% of the foam mass can affect both the density and compressive strength.

Although the mechanical properties were not significantly increased (an in most cases decreased) it is believed that nano-tubes will result in a significant increase in strength. Carbon nano tubes have a diameter several orders of magnitude smaller than the fibers used here and will most likely serve to bridge microcracking formed in the foam ligaments. Also, they have orders of magnitude higher strengths (over 100 times that of steel) and therefore will likely results in improved strengths.

However, increasing strength is not always the desire. In some energy absorption applications, having a reduced but controllable strength is desired. The goal of this invention is to demonstrate that strength (or other properties) can be modified in ways other than changing the operating variables (pressure, heating rate, temperatures, etc.).

While there has been shown and described a preferred embodiment of the invention, it will be obvious to those skilled in the art that various changes and modifications can be made therein without departing from the scope of the invention defined by the appended claims. For example, non-fibrous or metallic particulate may be used.

What is claimed is:

1. A thermally conductive pitch based foam composite comprising:
    a thermally conductive pitch based foam having ligaments; and
    a particulate intermixed substantially in said ligaments of said pitch based foam.

2. The thermally conductive pitch based foam composite of claim 1 in which said particulate is intermixed into said pitch based foam prior to foaming.

3. The thermally conductive pitch based foam composite of claim 1 in which said particulate is a carbon fiber, carbon nano-tube, or carbon particulate.

4. The thermally conductive pitch based foam composite of claim 3 in which the carbon fiber is selected from the group consisting of polyacrylnitrile (PAN) based carbon fibers, pitch based carbon fibers, and vapor grown carbon nano fibers.

5. The thermally conductive pitch based foam composite of claim 1 in which the composite foam has a thermal conductivity of at least 43 W/mK.

6. The thermally conductive pitch based foam composite of claim 1 in which the composite foam has a thermal conductivity divided by density of at least 132 (W/m·K)/(g/cc).

7. The thermally conductive pitch based foam composite of claim 1 in which the composite foam has a particulate mass of at least 1.5%.

8. The thermally conductive pitch based foam composite of claim 1 in which the composite foam is formed using the method comprising the steps of:

placing a pitch into a container;

mixing a particulate with said pitch in said container to form a mixture;

heating said mixture in an oxygen-free environment to melt said pitch in said mixture;

further heating to cause the evolution of gases to form a viscous pitch foam; and heat treating said viscous pitch foam.

9. The thermally conductive pitch based foam composite of claim 8, in which said particulate is mixed with said pitch after said pitch is melted.

10. The thermally conductive pitch based foam composite of claim 8, in which said step of further heating to cause the evolution of gases is conducted while said mixture is under pressure.

* * * * *